(No Model.)  2 Sheets—Sheet 1.
J. H. HOWARD.
HEEL BURNISHING MACHINE.
No. 318,903.  Patented May 26, 1885.
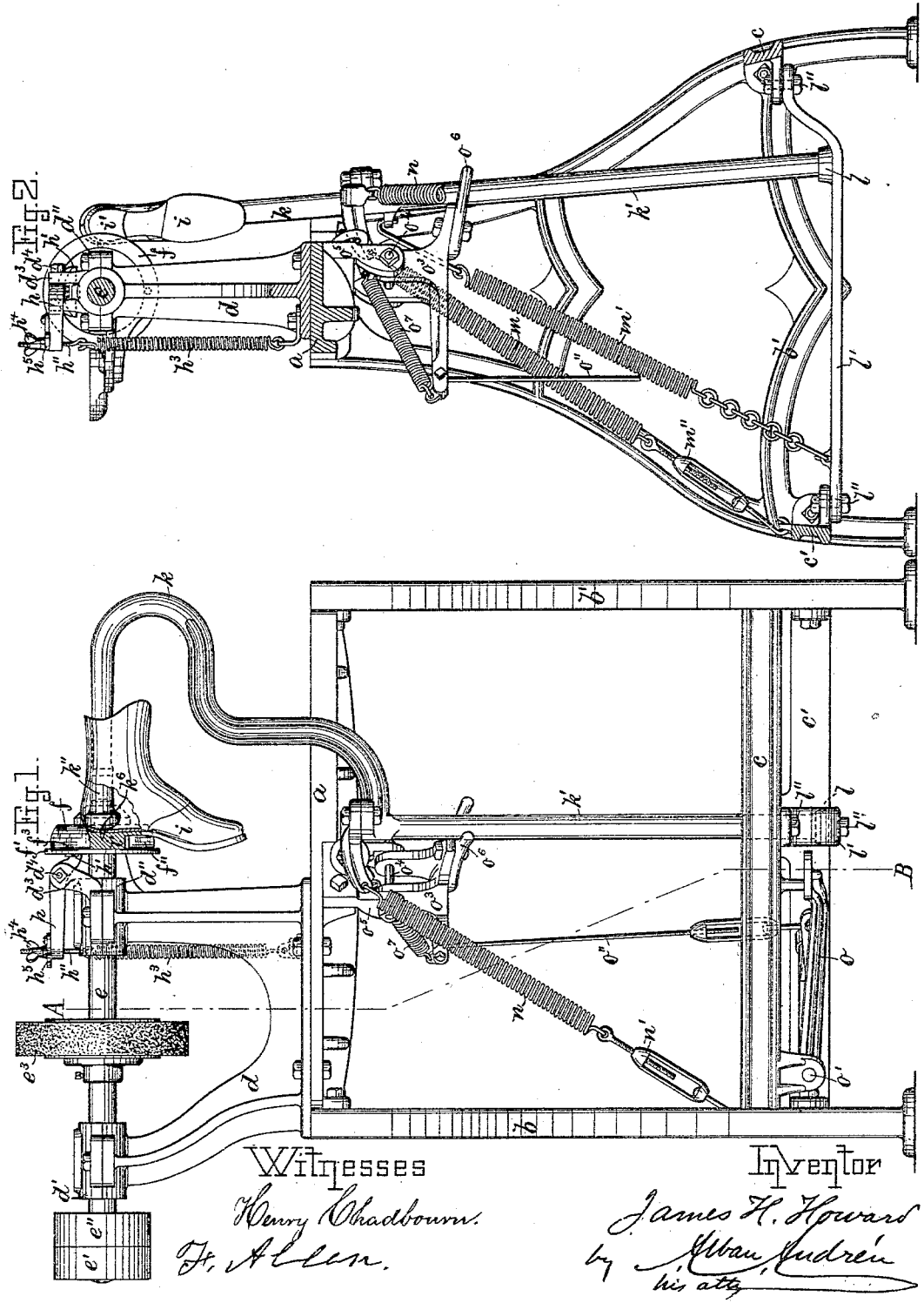
Witnesses
Henry Chadbourn.
F. Allen.
Inventor
James H. Howard
by Alban Andren
his atty (No Model.) 2 Sheets—Sheet 2.
J. H. HOWARD.
HEEL BURNISHING MACHINE.
No. 318,903. Patented May 26, 1885.
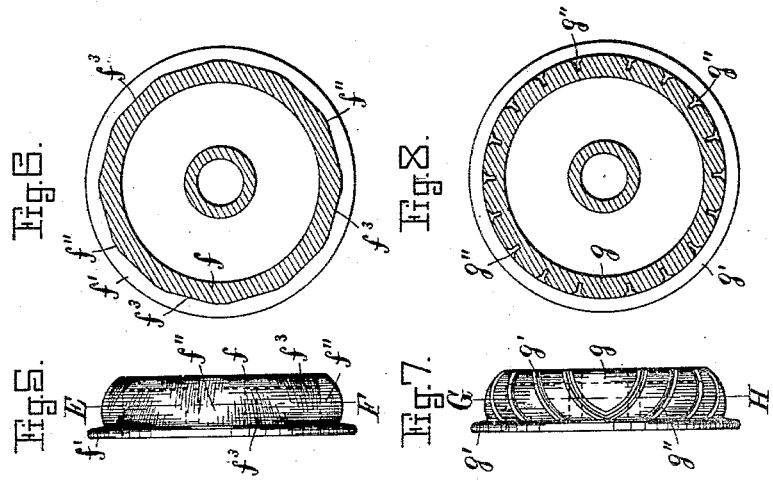
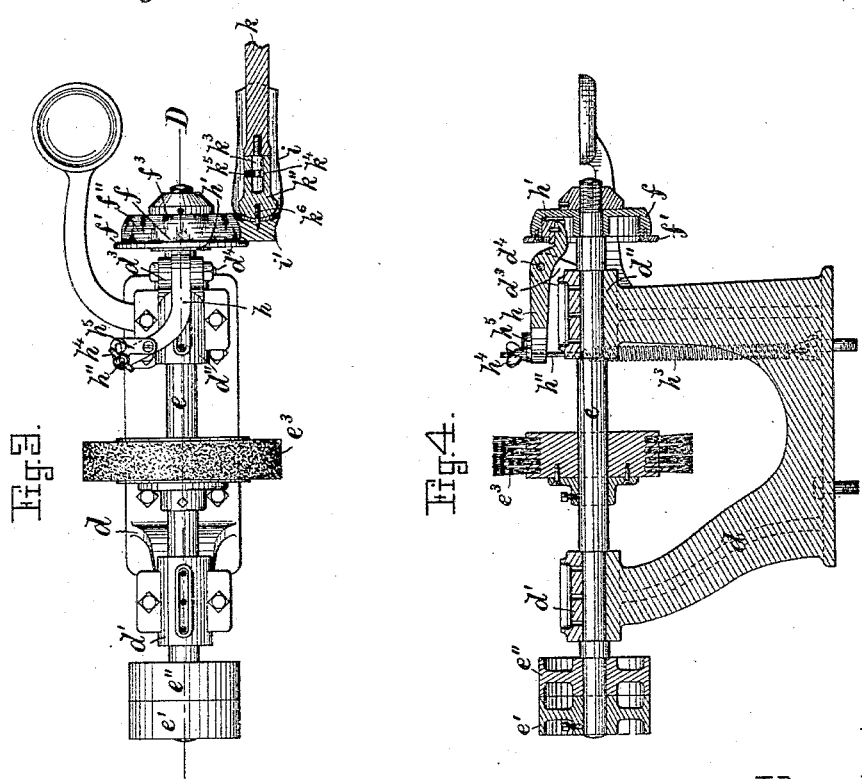
Witnesses
Henry Chadbourn.
H. Allen.
Inventor
James H. Howard.
by Alban Andren
his atty.

UNITED STATES PATENT OFFICE.

JAMES H. HOWARD, OF STONEHAM, MASSACHUSETTS, ASSIGNOR TO SAMUEL W. CHAMBERLIN, OF SAME PLACE.

HEEL-BURNISHING MACHINE.

SPECIFICATION forming part of Letters Patent No. 318,903, dated May 26, 1885.

Application filed January 22, 1885. (No model.)

*To all whom it may concern:*

Be it known that I, JAMES H. HOWARD, a citizen of the United States, residing at Stoneham, in the county of Middlesex and State of Massachusetts, have invented certain new and useful Improvements in Heel-Burnishing Machines; and I do hereby declare that the same are fully described in the following specification and illustrated in the accompanying drawings.

This invention relates to improvements in heel-burnishing machines of that class in which the burnishing-wheel is heated by friction.

The invention consists in the novel construction and combination of devices hereinafter described and claimed, reference being made to the accompanying drawings, in which—

Figure 1 represents a front elevation of the burnishing-machine, and Fig. 2 represents a cross-section on the line A B shown in Fig. 1. Fig. 3 represents a plan view of the head of the machine, and Fig. 4 represents a central longitudinal section on the line C D shown in Fig. 3. Fig. 5 represents a side view of the improved burnishing-wheel as used for dry-burnishing, and Fig. 6 represents a cross-section on the line E F shown in Fig. 5. Fig. 7 represents a side elevation of the grooved burnishing-wheel used for wax or composition work, and Fig. 8 represents a cross-section on the line G H shown in Fig. 7.

Similar letters refer to similar parts wherever they occur on the drawings.

$a$ represents the bed or table of the machine, secured in a suitable manner to the upright frames $b\ b'$.

$c$ and $c'$ are horizontal beams or braces, securing the lower ends of frames $b\ b'$ together at the front and rear, respectively, as shown in Figs. 1 and 2.

To the bed $a$ is secured the head $d$, having bearings $d'$ and $d''$ in its upper end for the rotary burnishing-shaft $e$, which latter is set in a rotary motion by means of belt-power applied to the pulley $c'$ on said shaft.

$e''$ is a loose pulley on shaft $e$, as usual.

$e^3$ is a cylindrical brush, secured in the usual manner to shaft $e$, for the purpose of brushing and cleaning the boots and shoes after they have been burnished.

$f$ is the burnishing-wheel, made of metal, and secured firmly to the end of shaft $e$, outside of the bearing $d''$, as shown. Said wheel is preferably made hollow at the rear side, and provided with a projecting annular flange, $f'$, as shown in Figs. 1, 2, 3, 4, 5, and 6, said flange being secured to the rear of wheel $f$ by means of suitable screws, so as to rotate with the wheel $f$. The external surface of wheel $f$ is made with a series of rounded projections, $f''\ f''$, and intermediate depressions, $f^3\ f^3$, as shown in Figs. 1, 3, 5, and 6, as and for the purpose set forth.

The wheel $f$ is intended to be used to burnish without the employment of gum, wax, or other polishing compounds; but where it is required to use the latter I employ a wheel, $g$, as shown in Figs. 7 and 8, having flange $g'$ and inclined or curved grooves or corrugations $g''\ g''$, as shown in said figures.

The burnishing-wheel, during its rotation, is heated by friction, as follows: To the bearing $d''$ is attached in a suitable manner the bracket $d^3$, having fulcrum-pin $d^4$, on which is loosely hung the lever $h$, having attached to its outer end in a suitable manner a friction-block, $h'$, made of wood, metal, or other suitable material, which is brought to bear against the interior or back of the burnishing-wheel $f$ with a yielding pressure during the revolution of said wheel, so as to cause the latter to be heated to the required temperature by the frictional resistance between wheel $f$ and friction-block $h'$. The rear end of lever $h$ has a screw-threaded rod, $h''$, passing loosely through it, the lower end of such rod being attached to a spring, $h^3$, secured to the head $b$, or any other stationary part of the machine. Above the lever $h$ the rod $h''$ has a thumb-nut, $h^4$, screwed on the upper end of the screw-threaded rod $h''$, and by these means the tension of spring $h^3$ can be adjusted, so as to increase or decrease the frictional resistance on the wheel $f$, and thereby to regulate the heat on said wheel according to the nature of the work that is to be done on it. Instead of spring $h^3$ an adjustable weight may be used, if so desired.

Near the rear end of lever $h$, and to its upper side, is hinged the slotted relieving-piece $h^5$, which, when the wheel $f$ is operated, is swung so as to lie between the said lever $h$ and thumb-nut $h^4$ until the desired temperature is obtained on wheel $f$, when the frictional resistance against the latter can instantly be relieved by swinging said slotted piece $h^5$ to the position shown in Fig. 3, causing the tension on spring $h^3$ to be lessened without the need of turning the thumb-nut $h^4$.

In combination with the rotary friction burnisher-wheel $f$, I use a yielding, swiveling, and rocking jack or shoe-support, $k$, attached to or made in one piece with the jack-post $k'$, the lower end of which rests loosely in a step, $l$, on the bearing-bar $l'$, secured in an adjustable manner by means of screw-bolts $l''\ l''$ to the respective braces $c$ and $c'$, as shown in Figs. 1 and 2.

I prefer to terminate the upper end of the curved jack $k$ as a swivel-rest, $k''$, that is free to turn on a horizontal spindle, $k^3$, secured to the end of jack $k$, as shown in Fig. 3, so as to permit said rest $k''$ to turn around its axis when the shoe $i$ is rocked or rotated during the process of burnishing the heel. To prevent said rest from getting detached from the jack I make an annular groove, $k^4$, on the spindle $k^3$, to receive the end of a small screw, $k^5$, that is screwed through the side of the swivel-rest $k''$, and said screw may be tightened up firmly against spindle $k^3$ in case it is desired to secure the rest $k''$ to the jack $k$. The rest $k''$ is provided in its outer end with a central pin or point, $k^6$, that is adapted to penetrate the sole of the shoe and a part of its heel $i'$, as shown in Fig. 3, so as to enable the boot or shoe heel to be held properly on the rest $k''$, as shown in said Fig. 3, with the under side of the heel resting against the flange.

During the process of burnishing the boot or shoe heel, while the boot or shoe is held on the jack $k$, it is essential that the latter should be automatically drawn back, so as to cause the curved outer portion of the heel to be held in contact with the rotary burnishing-wheel $f$ with a proper pressure, and for this purpose I use springs $m$ and $m'$, attached in their upper ends to the jack-post $k'$, or to ears or projections made in one piece with or secured to said jack-post. The lower end of spring $m$ is secured to rear brace, $c'$, and the lower end of spring $m'$ is secured to bearing-bar $l'$; or they may be secured in any other suitable manner to other stationary parts of the machine. One or both of said springs may be provided with an adjusting device, $m''$, to regulate the amount of pressure necessary between the heel and burnishing-wheel.

It is also essential that the under side of the heel should be held automatically against the flange $f'$ on the burnishing-wheel, and for this purpose I secure to the upper end of the jack-post $k'$, or to an ear or flange or projection thereon, the side spring, $n$, having its lower end secured in a suitable manner to the frame $b$, or to any other suitable and stationary part of the machine. Said spring may be provided with an adjusting device, $n'$, if so desired, to regulate its strength and the pressure between bottom of the shoe-heel and flange $f'$ on the burnishing-wheel $f$.

Instead of springs $m\ m'\ n$, may be used, as equivalents, weights, cords, and pulleys, if so desired.

After the boot or shoe heel has been burnished, it is necessary to withdraw it from contact with the wheel $f$ and its flange $f'$, to permit the shoe to be removed and another put on the jack $k$. For this purpose I use a treadle-lever, $o$, hung at $o'$, and provided with a connecting-rod, $o''$, to the rear end of the rocking lever $o^3$, which latter is hung on the pin $o^4$, suspended in bracket $o^5$, secured to bed $a$ of the machine, as shown in Figs. 1 and 2. The forward end of said lever $o^3$ has attached to it the forked piece $o^6$, that embraces the jack-post $k'$, and serves as a guide for the latter. To the rear end of the lever $o^3$ is attached the spring $o^7$, the upper end of which is secured to bracket $o^5$ or bed $a$, and said spring serves to automatically raise the rear end of lever $o^3$, and with it the treadle-lever $o$, as soon as the operator withdraws his foot from the treadle, by which the front edge of lever $o^3$ is disengaged from jack-post $k'$, allowing the springs $m\ m'\ n$ to pull the jack $k$ and the shoe held on it backward and sidewise, to permit the boot-heel to be held automatically with a proper pressure against the wheel $f$ and its flange $f'$. The lever $o^3$ is hung obliquely on the machine, so as to cause the jack $k$ to be moved or swung obliquely from the wheel $f$ when the treadle-lever $o$ is depressed, by which operation the front of lever $o^3$ is caused to push forward against the jack-post $k'$, and in this manner the bottom of the heel is withdrawn from the flange $f'$, and the outer curved portion of the heel withdrawn from the wheel $f$ at the same time, when it is desired to change the boot or shoe.

When it is desired to hold the boot or shoe in the hands of the operator without using a jack for its support, the flange on the burnishing-wheel may be dispensed with.

The friction device for heating the burnishing-wheel $f$ is made yielding, as shown and described, so as to allow for any unevenness in the friction contact-surface on wheel $f$, as well as to allow for the gradual wear of the journal-bearings in which the burnishing-shaft is running, and thus to prevent irregular or over heating of the burnisher-wheel.

Having thus fully described the nature, construction, and operation of my invention, I wish to secure by Letters Patent, and claim—

1. In a burnishing-machine, the rotary burnishing-wheel $f$, in combination with the rocking lever $h$, adapted to swing on fulcrum $d^4$, and having friction-block $h'$ in its outer end, bearing against the burnishing-wheel, and provided with a yielding spring, $h^3$, or its equivalent, and means for regulating it, as and for the purpose set forth.

2. The combination of the rotary burnishing-wheel and a yielding adjustable friction device acting directly on the wheel, to heat the same by friction during its rotation, with a swiveled and rocking boot or shoe support, and springs for automatically forcing the support toward the friction-heated wheel, substantially as described.

3. The combination of the rotary burnishing-wheel and a yielding and adjustable friction device acting directly on the wheel, to heat the same by friction during its rotation, with a swiveled and rocking boot or shoe support, springs for forcing the boot or shoe support toward the friction-heated wheel, and treadle mechanism connected with the boot or shoe support for moving it away from said wheel, substantially as described.

4. The combination, with a chambered burnishing-wheel, of a yielding adjustable friction device arranged in the chamber of the wheel and acting directly upon the interior of the latter for heating the same by friction, substantially as described.

5. The combination, with a burnishing-wheel, of a jack-post having its lower end loosely supported, and a boot or shoe support, $k''$, swiveled on a spindle, $k^3$, connected with the jack-post so as to turn on the spindle when the boot or shoe is rotated, substantially as described.

6. The combination, with a burnishing-wheel, of a jack-post, $k'$, loosely supported at its lower end so as to rock to and fro, a jack, $k$, connected with the post, a boot or shoe support, $k''$, swiveled to the jack, to turn axially thereon when the boot or shoe is rotated, and a spring connected with the post for forcing the parts toward the wheel, substantially as described.

7. The rotary burnishing-wheel $f$ and its yielding friction-lever $h\ h'$, in combination with the spring $h^3$, regulating-nut $h^4$, and intermediate relieving-piece, $h^5$, for the purpose of regulating the pressure on wheel $f$, as herein set forth.

In testimony whereof I have affixed my signature in presence of two witnesses.

JAMES H. HOWARD.

Witnesses:
ALBAN ANDRÉN,
HENRY CHADBOURN.